(No Model.)
C. K. CORDREY.
CORN HARVESTING MACHINE.
No. 457,760. Patented Aug. 11, 1891.
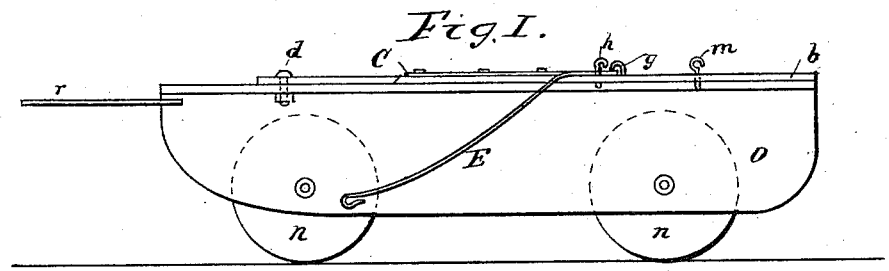
Fig. I.
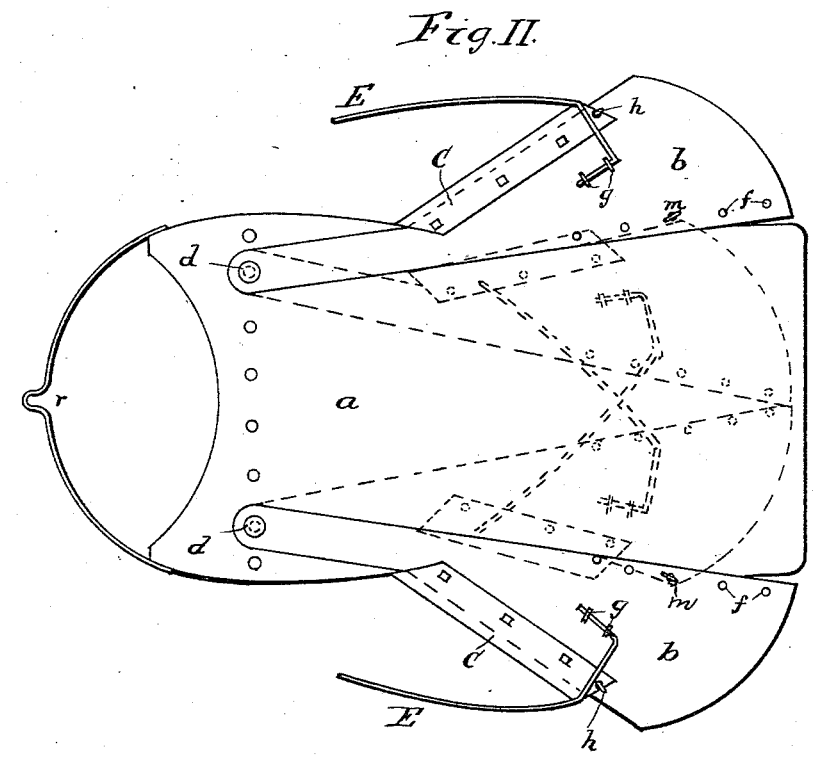
Fig. II.
WITNESSES
INVENTOR
Charles K. Cordrey
By W. L. Walker
Attorney
THE NORRIS PETERS CO., PHOTO-LITHO., WASHINGTON, D. C.

UNITED STATES PATENT OFFICE.

CHARLES K. CORDREY, OF BELLEFONTAINE, OHIO.

CORN-HARVESTING MACHINE.

SPECIFICATION forming part of Letters Patent No. 457,760, dated August 11, 1891.

Application filed June 28, 1890. Serial No. 357,164. (No model.)

*To all whom it may concern:*

Be it known that I, CHARLES K. CORDREY, a citizen of the United States, residing at Bellefontaine, in the county of Logan and State of Ohio, have invented certain new and useful Improvements in Corn-Harvesting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in machines for cutting standing corn. I attain this object by means of the mechanism illustrated in the accompanying drawings.

Figure I represents a side view of my machine; and Fig. II is a top view while in a cutting position, with the wings $b\,b$ expanded, as represented by the full dark lines, and their position when pushed in is represented by the dotted lines.

The drawings represent a platform $a$, made of one-inch boards nailed down on a framework underneath, having its two longest sides $o$, Fig. 1, made curving on the front ends, like a sled-runner, having rollers or wheels $n\,n$ extending several inches below the bottom of the side $o$ and turning upon an axle inserted through the side $o$, as shown in Fig. I, to ease the draft where the ground is favorable. These wheels or rollers may be of any desired width and diameter and made of wood or other suitable material, and may extend the entire space between the sides $o$.

$b\,b$ represent two movable adjusting-wings, which may each be made of wood or iron, having the edge or side cut flaring at such an angle as will best serve for cutting the stalks of corn as the machine is drawn forward and the knives C C come in contact with the stalks. These knives C C should be not less than twenty inches long and five inches wide, and ends cut angling may be made out of a thin plate of steel not exceeding three-eighths of an inch in thickness and having one side rolled down or ground to an edge and placed at the front flaring edge of the wings.

The wings $b\,b$ are pivoted at the points $d$ by a bolt having a washer and passing down through a hole made in the platform at $d$ and having a nut underneath or above, as desired, said bolts forming a pivot on which the said wings $b\,b$ may be turned outward or inward, and the pivot also may be changed by removing the screw-bolt outward or inward to the holes shown in Fig. II on line with the pivot $d\,d$. Holes $f\,f$ are made near the inner edges of the wings $b\,b$ near the ends, through which a bolt $m$ is dropped, which extends an inch or two below the under side of the wings $b\,b$, so that when dropped into these holes it locks the wings from being pressed in by coming in contact with the edge of the platform when the knives are cutting.

E represents a finger-guard made of round iron of a suitable size, held down to the platform by staples passing over the curved end at $g$, having a stop at $h$ to prevent its being pushed or being bent backward, so that it can be raised upward and turned up under the staples at $g$ when it is desired to move in the wings $b\,b$, as shown in Fig. II, and the front part of this finger is made to curve downward and outward to gather the leaning stalks and bring them into an upright position when they come in contact with the cutting-edges of the knives C C.

Now it will be seen at once that by withdrawing the bolt $m$ and raising the finger E, which turns under the staple at $g$, the wings $b\,b$ can be pushed in, so as to pass a stump, tree, or hill intended to be left standing to form the shock of corn, and also by changing the pivot $d$ to the holes on the right or left and changing the bolt $m$ to any of the holes $f$ the cutting-knives can be set to any desired angle and the alar extent enlarged or diminished to suit the various widths in which the rows of corn are planted. The width of the platform on which these wings rest should be such that the runners and rollers should all be inside the rows of corn, and the length about six feet and height about eight inches.

This machine may be drawn by a single horse hitched to the bail $r$ and walking in advance between the rows of corn, and is operated as follows: After the wings are adjusted to the proper width or angle for cutting through the pivots and bolts in the mode described one man stands on the platform with his right foot on wing b. He gathers the corn as it is cut with his right arm and bunches it into his left arm, while a man at the same time, with his left foot on the left wing b, gathers with his left arm as cut and bunches into his right arm, thus cutting each opposite hill simultaneously, and when the machine has advanced to what is called the "gallows-hill" the horse is stopped. The man next the gallows-hill sets up his bunch on the ground in front of the knife, then throws up the finger-guard, moves in the wing and drives past the gallows-hill, then stops the horse, and while the other man sets up his bunch the man next the gallows-hill throws down the finger-guard and adjusts the wing b to its proper position, both men assume their former positions on the machine, the horse is started, and the cutting goes on as stated. For the first round at the gallows-hills an extra stop is required to adjust the machine in order to pass the gallows-hills.

I am aware that prior to my invention other machines have been invented for corn-harvesting having cutting-knives set at an angle and moved forward in a similar way by one horse. I therefore do not broadly claim such flange or wing with the cutting-edge at a fixed angle and inadjustable; but What I do claim, and desire to secure by Letters Patent, is—

The combination, in a corn-harvester, of the adjustable wings b b, finger-guard E, turning on a hinge at g, locking device by bolt m, and rollers n n, substantially as set forth.

CHARLES K. CORDREY.

Witnesses:
HERMAN M. WALKER,
ANNA HENRY.